(12) United States Patent
Choo et al.

(10) Patent No.: US 7,379,150 B2
(45) Date of Patent: May 27, 2008

(54) MANUFACTURING METHOD OF LIQUID CRYSTAL DISPLAY

(75) Inventors: Dae-Ho Choo, Yongin (KR); Suk Ki, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 109 days.

(21) Appl. No.: 10/726,677

(22) Filed: Dec. 4, 2003

(65) Prior Publication Data

US 2004/0110317 A1    Jun. 10, 2004

(30) Foreign Application Priority Data

Dec. 4, 2002    (KR) ...................... 10-2002-0076607

(51) Int. Cl.
    *G02F 1/13*    (2006.01)
(52) U.S. Cl. ...................................... 349/189; 349/190
(58) Field of Classification Search ................ 349/187, 349/189, 190
    See application file for complete search history.

(56) References Cited

U.S. PATENT DOCUMENTS

| | | | | |
|---|---|---|---|---|
| 5,263,888 | A * | 11/1993 | Ishihara et al. | ................ 445/25 |
| 2002/0167638 | A1* | 11/2002 | Byun et al. | .................. 349/187 |
| 2003/0063251 | A1* | 4/2003 | Murata et al. | ............... 349/189 |
| 2003/0184708 | A1* | 10/2003 | Kweon et al. | ............... 349/189 |
| 2004/0001177 | A1* | 1/2004 | Byun et al. | .................. 349/187 |
| 2004/0012755 | A1* | 1/2004 | Choo et al. | .................. 349/190 |
| 2004/0046925 | A1* | 3/2004 | Matsuda | ...................... 349/187 |
| 2004/0207800 | A1* | 10/2004 | Hiruma et al. | ............... 349/189 |

FOREIGN PATENT DOCUMENTS

| | | | |
|---|---|---|---|
| JP | 03-102323 | 4/1991 | |
| JP | 05-241165 | 9/1993 | |
| JP | 05-281557 | 10/1993 | |
| JP | 2001-117105 | 4/2001 | |
| JP | 2001-133799 | 5/2001 | |
| JP | 2001-281678 | 10/2001 | |
| JP | 2002-014360 | * 1/2002 | ................ 349/189 |
| JP | 2002-258299 | * 1/2002 | ................ 349/189 |
| JP | 2002-341362 | * 11/2002 | ................ 349/189 |
| KR | 1998-042231 | 8/1998 | |
| KR | 1020020031251 | 5/2002 | |
| KR | 1020020046757 | 6/2002 | |

OTHER PUBLICATIONS

Patent Abstract of Japan, 2002-122870, Apr. 2002.*

(Continued)

*Primary Examiner*—James A. Dudek
(74) *Attorney, Agent, or Firm*—F. Chau & Associates, LLC

(57) ABSTRACT

A method of manufacturing a liquid crystal display is provided, which includes: forming a sealant on a first panel; dropping liquid crystal on the first panel to form a plurality of liquid crystal dots; assembling a second panel with the first panel, wherein the first and the second panels have a striped array of pixel areas, each stripe extending in a first direction, and a first distance in the first direction between the liquid crystal dots is equal to or smaller than a second distance in a second direction perpendicular to the first direction between the liquid crystal dots.

19 Claims, 6 Drawing Sheets

OTHER PUBLICATIONS

English Abstract for Japanese Publication No. 05-281557.
English Abstract for Japanese Publication No. 2001-117105.
English Abstract for Japanese Publication No. 2001-133799.
English Abstract for Japanese Publication No. 2001-281678.
English Abstract for Korean Publication No. 1020020031251.
English Abstract for Korean Publication No. 1020020046757.
English Abstract for Japanese Publication No. 03-102323.
English Abstract for Japanese Publication No. 05-241165.
English Abstract for Korean Publication No. 1998-042231.

* cited by examiner

MANUFACTURING METHOD OF LIQUID CRYSTAL DISPLAY

BACKGROUND OF THE INVENTION (a) Field of the Invention

The present invention relates to a method of manufacturing a liquid crystal display.

(b) Description of the Related Art

Generally, a liquid crystal display (LCD) includes upper and lower panels provided with field-generating electrodes and a liquid crystal (LC) layer interposed therebetween. The upper and the lower panels are combined with a sealant printed along periphery thereof and enclosing the LC layer and they are spaced apart with a gap supported by a plurality of spacers.

The LCD applies voltages to the field-generating electrodes to generate an electric field in the LC layer having a dielectric anisotropy and controls the magnitude of the voltages applied to the electrodes to control the strength of the electric field, thereby controlling the transmittance of light passing through the LC layer to display images.

One of the techniques of filling the liquid crystal in the gap between the two panels is so called drop filling. The drop filling defines a filling area enclosed by a sealant having a closed-loop shape on one of the two panels and drops the liquid crystal in the filling area. The two panels are assembled in a vacuum state and the sealant is hardened. An important issue is to make the thickness of the liquid crystal kept constant without any void in the filling area of the panel for obtaining a uniform cell gap.

The uniformity of the cell gap is determined by the uniformity and the amount of a liquid crystal coated in the filling area on the panel. In order to improve the uniformity of the cell gap and to remove the voids in the liquid crystal layer as well as to match the process time in a manufacturing line, it is preferable to shorten the tact time by using one drop filling that has an advantage of filling accurate amount of the liquid crystal. It is because although each drop causes a minute deviation, the accumulation of the minute deviations for several drops causes significant errors.

However, the one drop filling has a disadvantage of the prevention of voids. The voids are mainly formed by different diffusion distances when diffusing the dropped liquid crystal. In particular, the voids are more probable to be generated near the corners of the panels. The difference in the diffusion distances is resulted from several causes such as the rectangular shapes of the panels, the difference in the materials of the diffusion surfaces, the evenness of the diffusion surfaces, existence of the sealant, and so on.

The probability of the generation of the voids depends on the characteristics of the liquid crystal and the modes of the LCD. For example, a twisted nematic (TN) mode LCD, an in-plane-switching (IPS) mode LCD, and an optically compensated birefringent (OCB) mode LCD, which employ homogeneous (or horizontal) liquid crystal alignment, has less probability of the void generation than a vertically aligned (VA) mode LCD employing homeotropic (or vertical) liquid crystal alignment. The voids generated in the display area is called AUA (active unfilled area), while the voids generated near the sealant is called SUA (surface unfilled area).

SUMMARY OF THE INVENTION

A motivation of the present invention is to reduce voids in a liquid crystal layer.

A method of manufacturing a liquid crystal display is provided, which includes: forming a sealant on a first panel; dropping liquid crystal on the first panel to form a plurality of liquid crystal dots; assembling a second panel with the first panel, wherein the first and the second panels have a striped array of pixel areas, each stripe extending in a first direction, and a first distance in the first direction between the liquid crystal dots is equal to or smaller than a second distance in a second direction perpendicular to the first direction between the liquid crystal dots.

Preferably, the first and the second distances are in a range of about 5-40 mm and an amount of one drop of the liquid crystal is in a range of about 1-15 mg.

The liquid crystal dots preferably include a plurality of first dots arranged along a plurality of straight lines, which preferably extend in the second direction such that the first dots form a plurality of dot rows.

The first dots in adjacent two of the dot rows may be arranged along a straight line extending in the first direction.

Alternatively, the first dots in adjacent two of the dot rows may be arranged offset in the first direction. Each of the first dots in one of the dot rows preferably has four equidistant nearest neighbors of the first dots in adjacent rows.

A third distance between the sealant and one of the first dots closest to the sealant may be equal to or smaller than the first distance. In this case, the liquid crystal, which preferably includes nematic liquid crystal, is preferably aligned such that long axes of molecules of the liquid crystal are substantially parallel to a surface of the first and the second panels.

Alternatively, a third distance between the sealant and one of the first dots closest to the sealant is equal to or larger than the second distance. In this case, the liquid crystal is aligned such that long axes of molecules of the liquid crystal are substantially perpendicular to a surface of the first and the second panels. The liquid crystal may include smectic liquid crystal.

According to an embodiment of the present invention, the liquid crystal dots further include a plurality of second dots disposed near a corner of the sealant.

According to another embodiment of the present invention, the liquid crystal dots further include a plurality of second dots disposed around an edge of the first panel, which are preferably smaller than the first dots. Preferably, a third distance in the second direction between one of the second dots and one of the first dots closest to the one of the second dots is equal to or larger than the second distance and equal to or smaller than a fourth distance in the first direction between one of the second dots and one of the first dots closest to the one of the second dots.

The method may further include: curing the sealant after assembling the first and the second panels. The curing of the sealant may include: light curing the sealant; and heat curing the sealant.

DETAILED DESCRIPTION OF THE PREFERRED EMBODIMENTS

Figure 1:
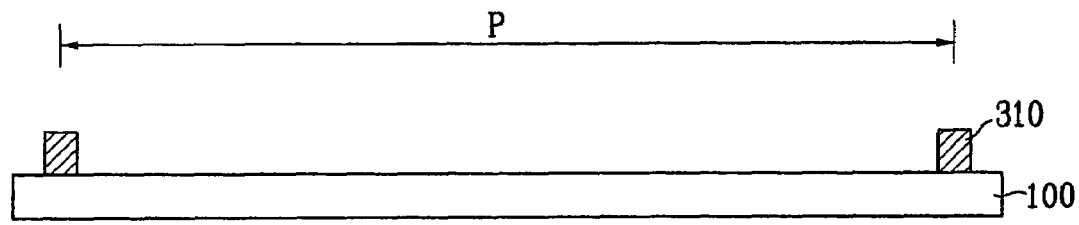
FIGS. 1, 2 and 5 are sectional views of an LCD in intermediate steps of manufacturing method thereof according to an embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Now, liquid crystal displays and manufacturing methods thereof according to embodiments of the present invention will be described with reference to the accompanying drawings.

A manufacturing method of an LCD according to an embodiment of the present invention is described in detail with reference FIGS. 1-3.

Figure 2:
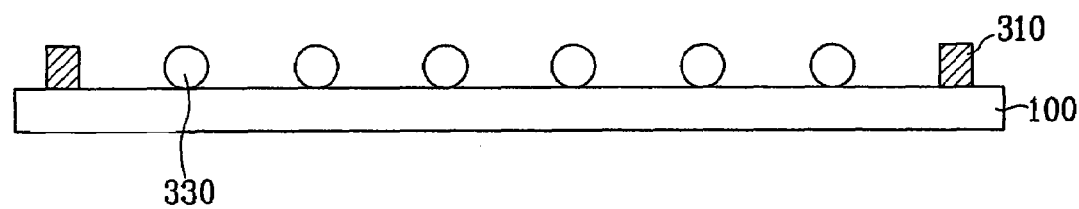
Figure 3:
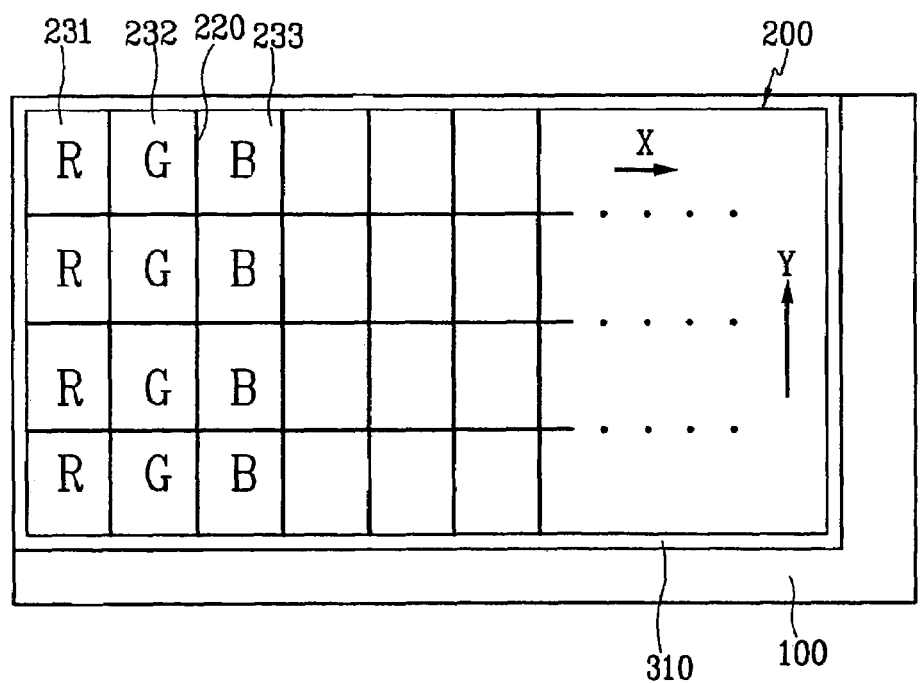
FIG. 3 is a schematic plan view of an LCD according to an embodiment of the present invention.
Figure 5:
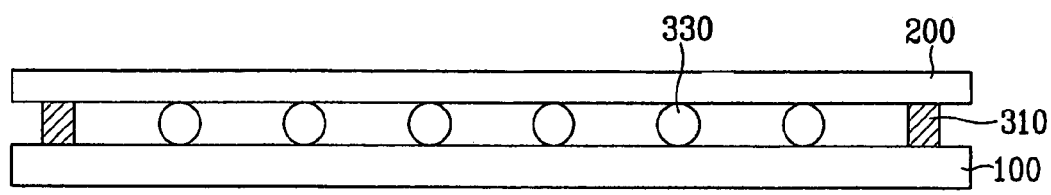

FIGS. 1, 2 and 5 are sectional views of an LCD in intermediate steps of manufacturing method thereof according to an embodiment of the present invention, and FIG. 3 is a schematic plan view of an LCD according to an embodiment of the present invention.

Referring to FIG. 1, a sealant 310 is formed on a first panel 100 including a plurality of thin film transistors (TFTs), which is usually called a TFT array panel. The sealant 310 adheres a second panel 200 called a color filter (CF) array panel to the TFT array panel 100 and confines a liquid crystal therein. The sealant 310 corresponds to a periphery of the color filter array panel 200. An area enclosed by the sealant 310 is defined as an active area P.

Referring to FIG. 2, a liquid crystal is dropped in the active area P on the TFT array panel 100 to form a plurality of LC dots 330.

FIG. 3 is a schematic plan view of an LCD according to an embodiment of the present invention.

Referring to FIG. 3, a plurality of red (R), green (G) and blue (B) pixel areas 231, 232 and 233 are formed on the color filter array panel 200 of the LCD. Each of the pixel areas 231, 232 and 233 are located substantially in an area defined by a black matrix 220 and the pixel areas 231, 232 and 233 are arranged in a matrix.

Each row indicated by an X direction includes a plurality of R, G and B pixel areas 231, 232 and 233 arranged in turn. As shown in FIG. 3, a branch of the black matrix 220 is located right to an R pixel area 231 and a G pixel area 232 is disposed right to the branch of the black matrix 220. Likewise, another branch of the black matrix 220 is located right to the G pixel area 232 and a B pixel area 233 is disposed right to the another branch of the black matrix 220. Similarly, another branch of the black matrix 220 is located right to the B pixel area 233 and a R pixel area 231 is disposed right to the branch of the black matrix 220.

The pixel areas 231, 232 and 233 in each column indicated by a Y direction represent the same color, i.e., one of red, green and blue. As shown in FIG. 3, a first column includes only R pixel areas 231 interposing branches of the black matrix 220, a second column includes only G pixel areas 232, and a third column includes B pixel areas 233.

Figure 4A:
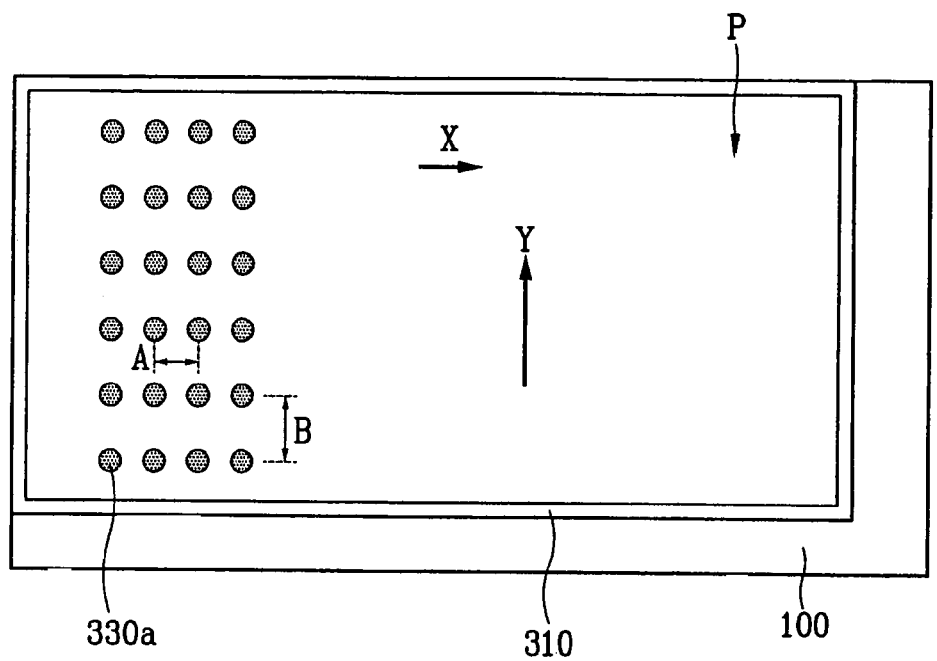
FIGS. 4A and 4B, 6A and 6B, 7A and 7B, 8A and 8B, and 9A and 9B show patterns of LC dots according to embodiments of the present invention.
Figure 4B:
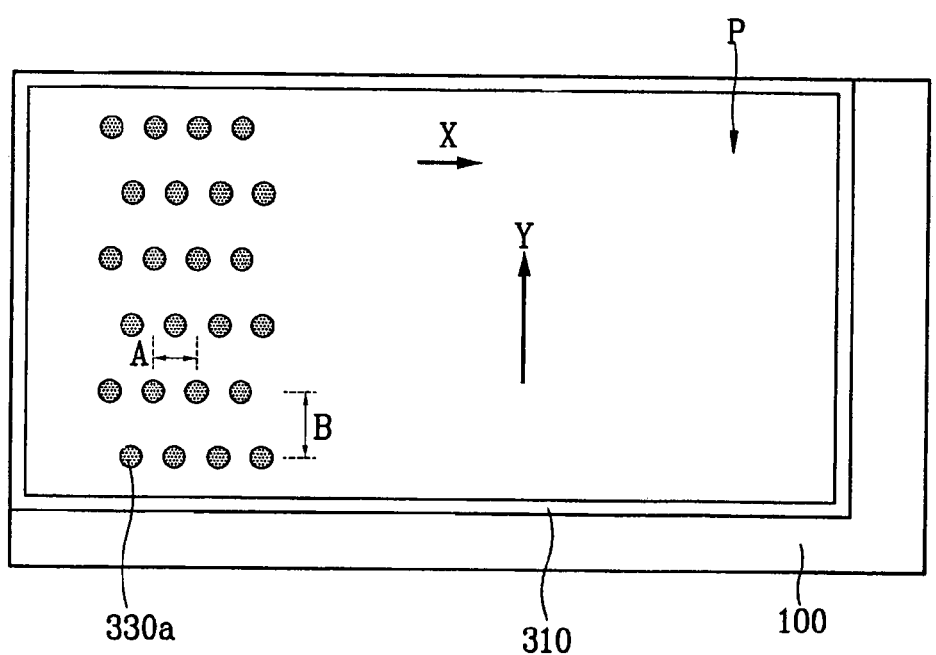

FIGS. 4A and 4B show patterns of LC dots formed in a sealant 310 according to embodiments of the present invention.

As shown in FIGS. 4A and 4B, a plurality of rows of LC dots 330a are formed on a TFT array panel 100. The distance A between adjacent LC dots 330a in each row is constant and the distance B between adjacent rows of the LC dots 330a is also constant. The distances A and B or the concentration of the LC dots 330a may be determined depending on the types of LCDs. For example, the concentration of the LC dots 330a for a homogeneously aligned liquid crystal is preferably lower than that for a homeotropically aligned liquid crystal, and the concentration of the LC dots 330a for a nematic liquid crystal, is preferably lower than that for a smectic liquid crystal, which has lower diffusively than the nematic liquid crystal.

The distances A and B satisfy a relation $A \leq B$ since the diffusion of the LC dot 330a in X direction experiences different diffusion surfaces between R, G and B pixel areas and several protrusions and depressions such that the diffusion distance in the row direction becomes short, while the diffusion in Y direction does not. That is, the distance between the LC dots 330a in X direction where the diffusion distance is relatively short is smaller than that in Y direction where the diffusion distance is relatively long such that the diffusion of the liquid crystal is sufficient for preventing the generation of voids.

The distances A and B are preferably in a range of about 5-40 mm and they are preferably determined in consideration of the diffusion distances in X and Y directions. A distance between the LC dots 330a lower than 5 mm may not meet the process speed of an in-line LCD manufacturing equipment, and a distance larger than 40 mm may make the AUA (active unfilled area) control difficult.

Furthermore, amount of one drop for forming an LC dot is preferably in a range of about 1-15 mg. The amount of one drop less than one milligram requires increased number of the LC dots to increase the tact time. On the contrary, the amount of one drop larger than 15 milligrams increases the deviation of the LC drop amount to increase the probability of the generation of the AUA and the SUA, thereby making the cell gap control difficult.

The above-described conditions are applicable to any of a twisted nematic (TN) mode LCD, an in-plain switching (IPS) mode LCD, and an optical compensated bend (OCB) mode LCD, as well as to a vertically-aligned (VA) mode LCD.

The LC dots 330a shown in FIG. 4A form a regular matrix. Each LC dot 330a in a row has two nearest neighbors and four next nearest neighbors in upper and lower rows.

The LC dots 330a in adjacent rows shown in FIG. 4B are offset in Y direction. Preferably, the LC dots 330a are arranged such that each LC dot 330a in a row has four nearest neighbors in upper and lower rows. This arrangement effectively removes voids probable to be generated between the next nearest neighbors shown in FIG. 4A. For example, if the distance B in the arrangement shown in FIG. 4A is determined to be twice the diffusion distance in Y direction, the liquid crystal may not reach a place on a midpoint of a line segment connecting the next nearest neighbors such that a void may be generated there. If the distance B in the arrangement shown in FIG. 4A is determined to have a magnitude much larger than twice the diffusion distance in Y direction such that the above-described place on the line segment is filled with the liquid crystal, the number of the LC dots 330a is larger than that effectively required. In particular, although the distance B is determined much larger than twice the diffusion distance in Y direction, the probability of generation of voids is increased when the diffusion surface gives higher surface tension than is expected to reduce the diffusion distance. However, the arrangement shown in FIG. 4B, which gives four nearest neighbors in adjacent row spaced apart by equal distances, effectively removes local voids.

Referring to FIG. 5, the color filter array panel 200 is attached to the TFT array panel 100 with the LC dots 330a and the sealant 310 is UV cured to be hardened.

Furthermore, the sealant 310 may be additionally cured by heat. If the liquid crystal is in smectic phase, the smectic LC is transphased into a nematic LC having increased diffusively by the heat. The heat curing is preferably performed at a temperature of about 120° C. for about 50 minutes.

Figure 6A:
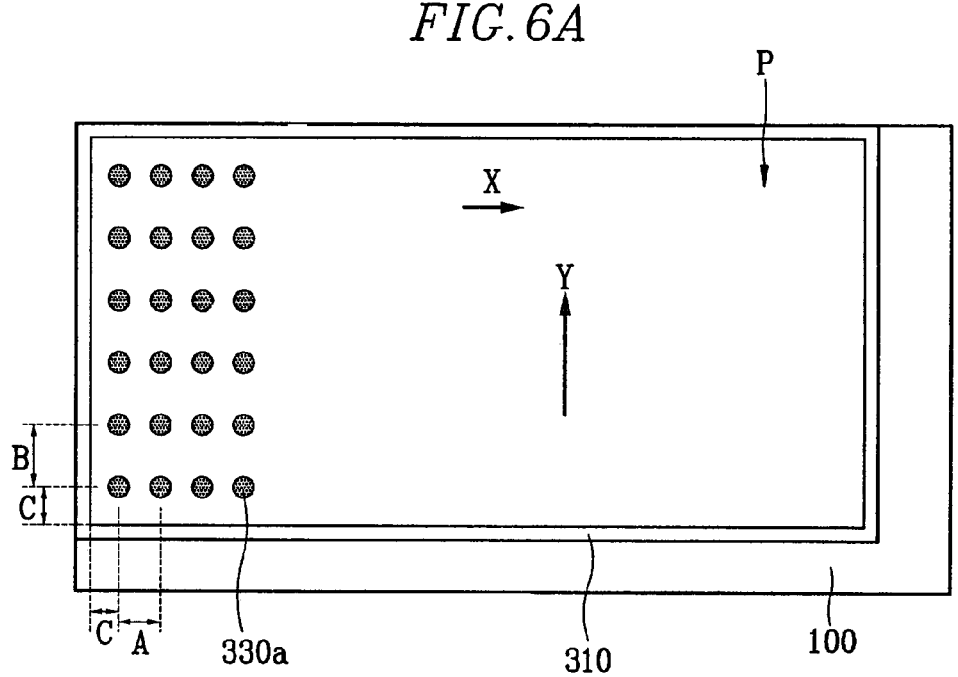
Figure 6B:
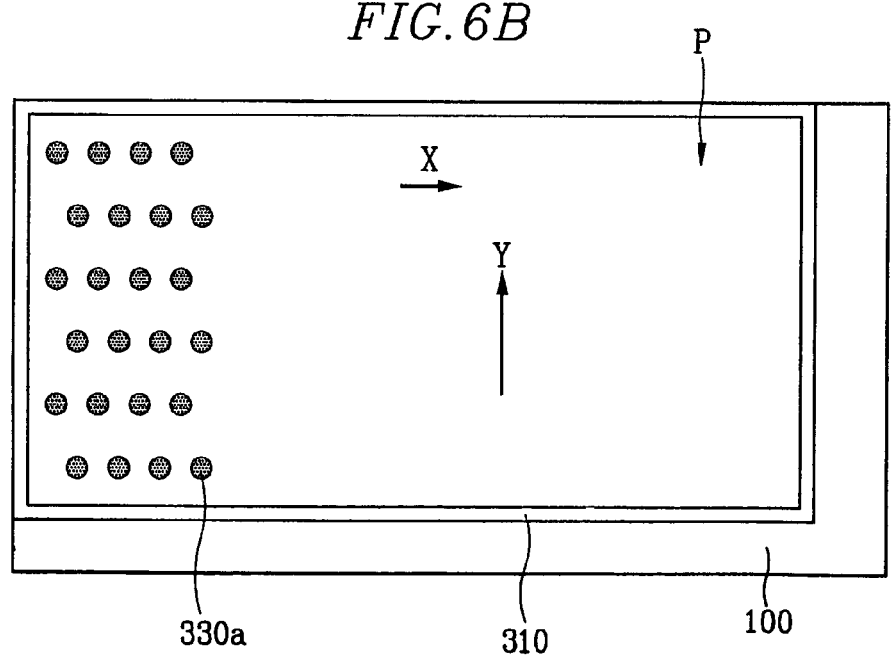

FIGS. 6A and 6B show patterns of LC dots according to other embodiments of the present invention.

As shown in FIGS. 6A and 6B, a plurality of rows of LC dots 330a are formed on a TFT array panel 100 such that a distance A between adjacent LC dots 330a in a row, a distance B between adjacent rows, and a distance C between a sealant 310 and the LC dots closest thereto satisfy $C \leq A \leq B$. In other words, the concentration of the LC dots 330a near the sealant 310 is higher than that at the other positions. The high concentration of the LC dots 330a near the sealant 310 may remove the voids probable to be generated near the sealant 310.

The above-described condition is determined since the LC diffusively near the sealant 310 is reduced. This condition is preferably applicable to the LCDs having homogeneous liquid crystal alignment such as the TN mode LCD, the IPS mode LCD, and the OCB mode LCD. In this case, the concentration of the LC dots 330a near the sealant 310 is preferably high in consideration of the affinity of the liquid crystal and the sealant 310.

Figure 7A:
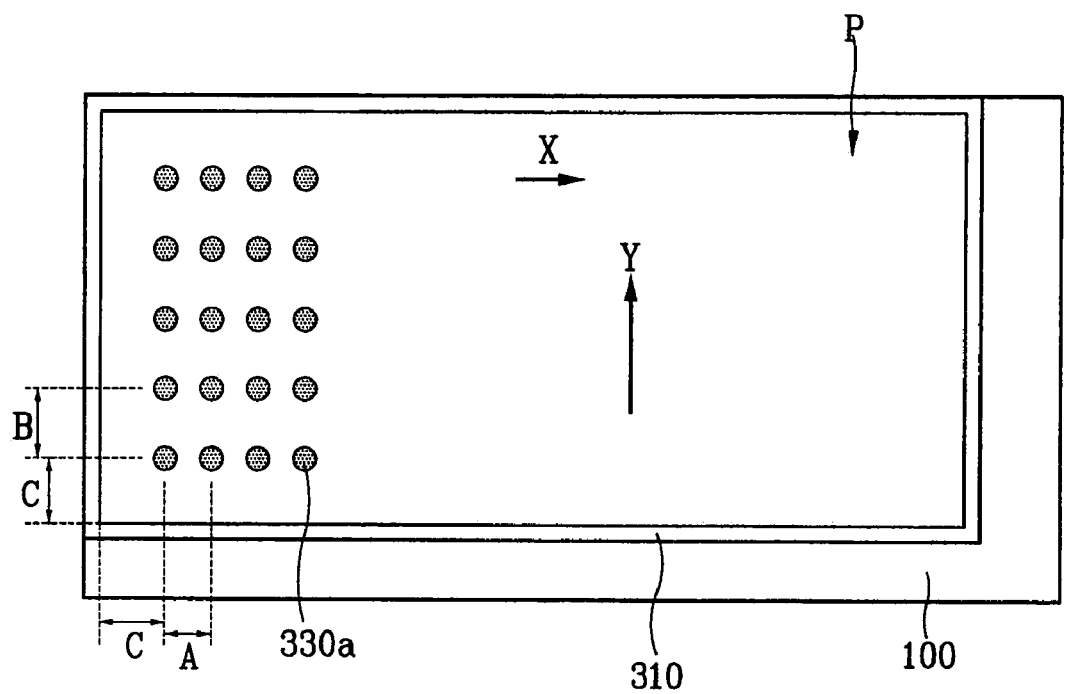
Figure 7B:
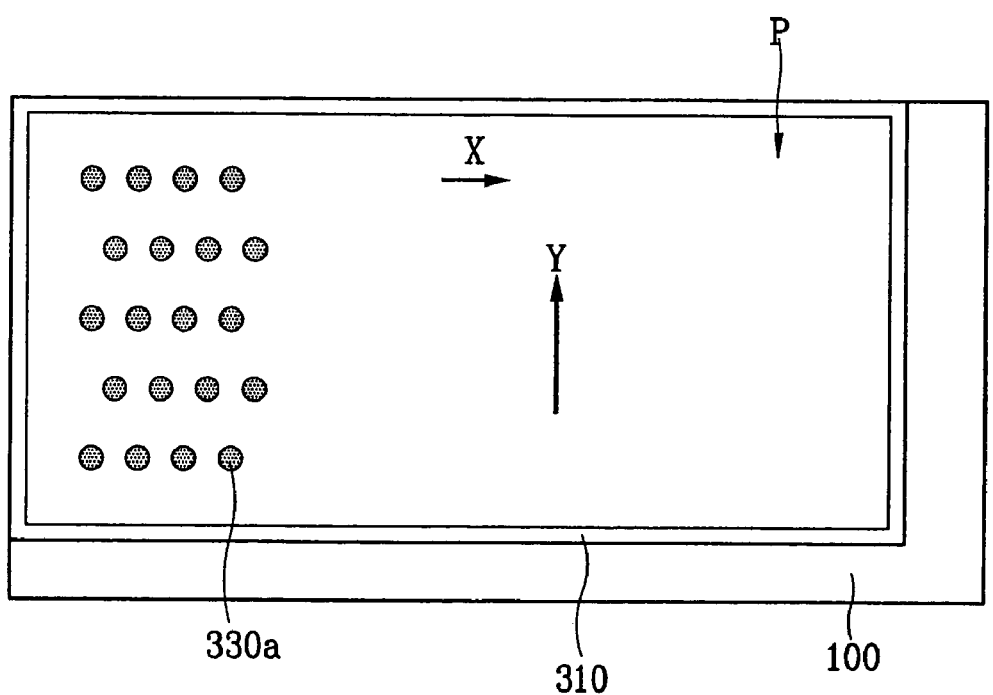

FIGS. 7A and 7B show patterns of LC dots according to other embodiments of the present invention.

As shown in FIGS. 7A and 7B, a plurality of rows of LC dots 330a are formed on a TFT array panel 100 such that a distance A between adjacent LC dots 330a in a row, a distance B between adjacent rows, and a distance C between a sealant 310 and the LC dots 330a closest thereto satisfy $A \leq B \leq C$.

This condition is preferably applied to the VA mode LCD having homeotropic LC alignment or smectic liquid crystal. The homeotropically aligned liquid crystal has lower diffusively than the homogeneously aligned liquid crystal as described above. In this case, if the concentration of the LC dots 330a near the sealant 310 is high, the pressure applied to the sealant 310 located between the TFT array panel 100 and the color filter array panel 200 for combining the two panels 100 and 200 is required to be increased, but high pressure exerted on the sealant 310 may break the sealant 310. Accordingly, it is preferable to reduce the concentration of the LC dots 330a for the VA mode LCD.

Figure 8A:
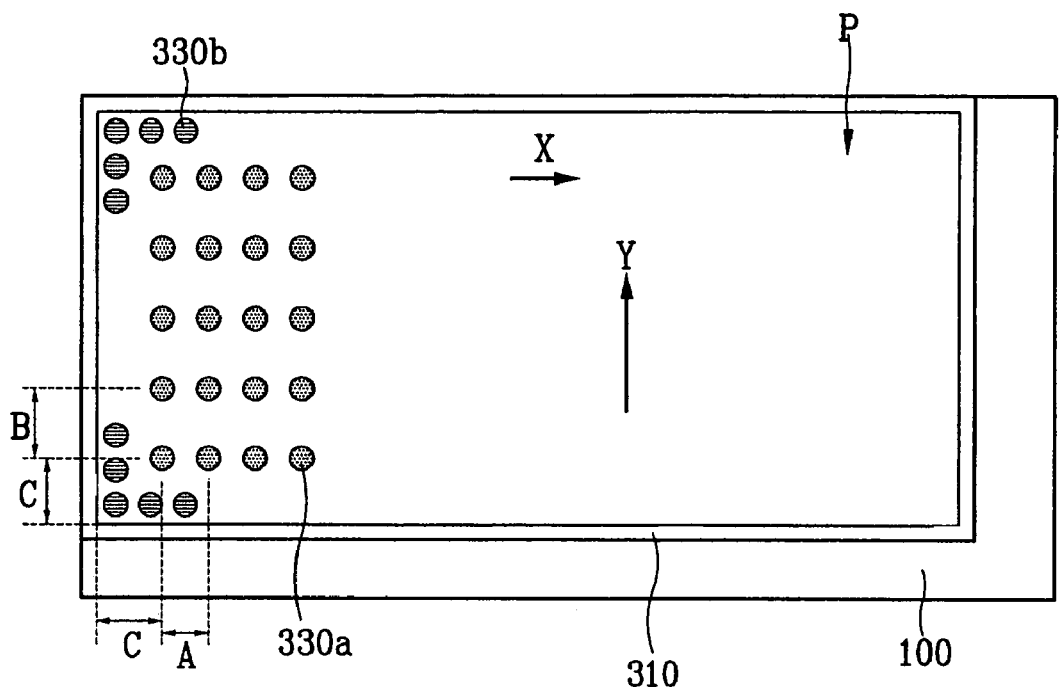
Figure 8B:
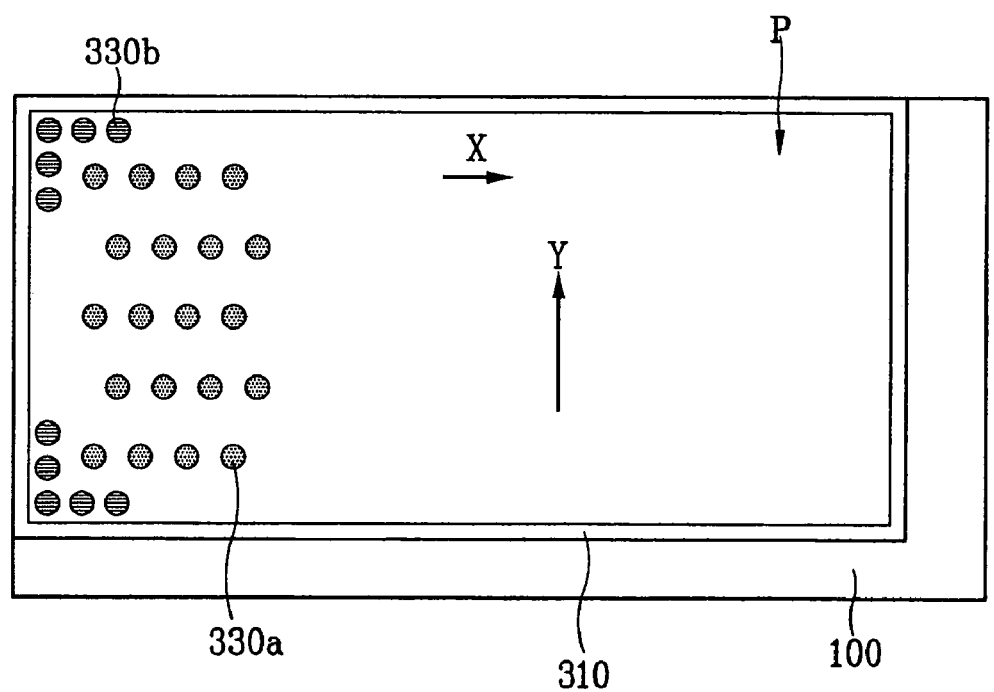

FIGS. 8A and 8B show patterns of LC dots according to other embodiments of the present invention.

As shown in FIGS. 8A and 8B, a plurality of rows of inner LC dots 330a are formed on most of an active area P of a TFT array panel 100 enclosed by a sealant 310 and a plurality of corner LC dots 330b are formed near corners of the active area P. The corner LC dots 330b may be larger or smaller than the inner LC dots 330a, or may have the same size as the inner LC dots 330a. The corner LC dots 330b prevents the generation of voids near the corners of the active area P and around the periphery of the active area P, and, in particular, they are important for a VA mode LCD having relatively low liquid crystal diffusively.

Figure 9A:
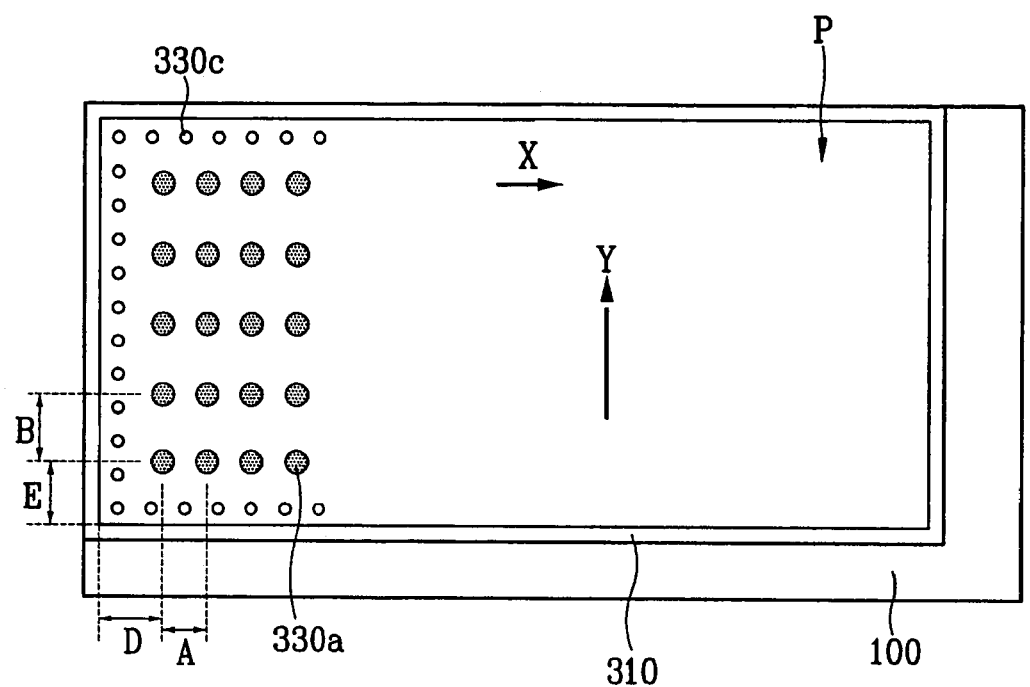
Figure 9B:
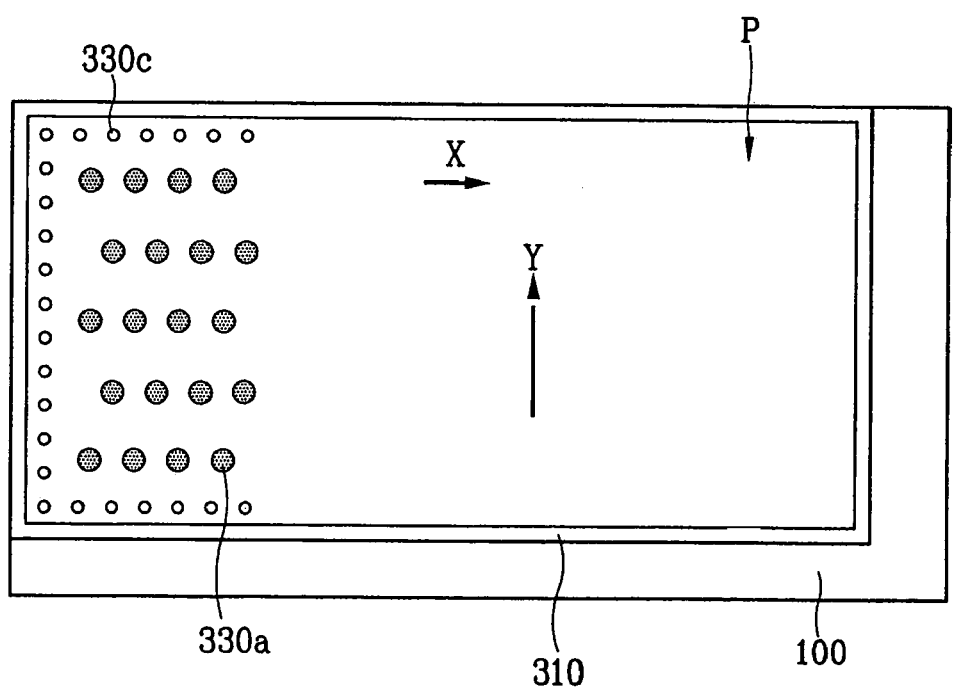

FIGS. 9A and 9B show patterns of LC dots according to other embodiments of the present invention.

As shown in FIGS. 9A and 9B, a plurality of rows of inner LC dots 330a are formed on most of an active area P of a TFT array panel 100 enclosed by a sealant 310 and a plurality of edge LC dots 330c are formed around edges of the active area P. It is preferable that the edge LC dots 330c are larger than the inner LC dots 330a.

The LCD dots 330a and 330b are arranged such that a distance A between adjacent LC dots 330a in a row, a distance B between adjacent rows, a distance D in X direction between the leftmost edge LC dots 330c and the leftmost inner LC dots 330a or between the rightmost edge LC dots 330c and the rightmost inner LC dots 330a, and a distance E between the lowermost edge LC dots 330c and the lowermost inner LC dots 330a or between the uppermost edge LC dots 330c and the uppermost inner LC dots 330a satisfy $A \leq B \leq D \leq E$. The above-described conditions $A \leq D$ and $B \leq E$ is chosen for facilitating to press the TFT array panel 100 and a color filter array panel 200 without loss of the sealant 310 and for preventing the SUA. In addition, the above-described condition $D \leq E$ is chosen for the above-described reason for $A \leq B$, that is, since the diffusion distance in Y direction is longer that in X direction.

The manufacturing methods according to the embodiments of the present invention reduce the probable voids by suitable adjusting the patterns and the amounts of the LC dots, thereby obtaining uniform cell gap.

While the present invention has been described in detail with reference to the embodiments, those skilled in the art will appreciate that various modifications and substitutions can be made thereto without departing from the spirit and scope of the present invention as set forth in the appended claims.

What is claimed is:

1. A method of manufacturing a liquid crystal display, the method comprising:
   forming a sealant on a first panel;
   dropping liquid crystal on the first panel to form a plurality of liquid crystal dots; and
   assembling a second panel with the first panel,
   wherein the first and the second panels have a striped array of pixel areas, each stripe extending in a first direction, and a first distance in the first direction between the liquid crystal dots is equal to or smaller than a second distance in a second direction perpendicular to the first direction between the liquid crystal dots,
   wherein the liquid crystal dots comprise a plurality of first dots arranged along a plurality of straight lines, the straight lines extend in the second direction such that the first dots form a plurality of dot rows, and the first dots in adjacent two of the dot rows are arranged offset in the first direction.

2. The method of claim 1, wherein an amount of one drop of the liquid crystal is in a range of about 1-15 mg.

3. The method of claim 1, wherein the first dots in adjacent two of the dot rows are arranged along a straight line extending in the first direction.

4. The method of claim 1, wherein each of the first dots in one of the dot rows has four equidistant nearest neighbors of the first dots in adjacent rows.

5. The method of claim 1, wherein a third distance between the sealant and one of the first dots closest to the sealant is equal to or smaller than the first distance.

6. The method of claim 5, wherein the liquid crystal is aligned such that long axes of molecules of the liquid crystal are substantially parallel to a surface of the first and the second panels.

7. The method of claim 5, wherein the liquid crystal comprises nematic liquid crystal.

8. The method of claim 1, wherein a third distance between the sealant and one of the first dots closest to the sealant is equal to or larger than the second distance.

9. The method of claim 8, wherein the liquid crystal is aligned such that long axes of molecules of the liquid crystal are substantially perpendicular to a surface of the first and the second panels.

10. The method of claim 8, wherein the liquid crystal comprises smectic liquid crystal.

11. The method of claim 8, wherein the liquid crystal dots further comprises a plurality of second dots disposed near a corner of the sealant.

12. The method of claim 8, wherein the liquid crystal dots further comprises a plurality of second dots disposed around an edge of the first panel.

13. The method of claim 12, wherein the second dots are smaller than the first dots.

14. The method of claim 13, wherein a third distance in the second direction between one of the second dots and one of the first dots closest to the one of the second dots is equal to or larger than the second distance and equal to or smaller than a fourth distance in the first direction between one of the second dots and one of the first dots closest to the one of the second dots.

15. The method of claim 1, further comprising:
curing the sealant after assembling the first and the second panels.

16. The method of claim 15, wherein the curing of the sealant comprises:
light curing the sealant; and
heat curing the sealant.

17. The method of claim 1, wherein the first and the second distances are in a range of about 5-40 mm.

18. A method of manufacturing a liquid crystal display, the method comprising:
forming a sealant on a first panel;
dropping liquid crystal on the first panel to form a plurality of first liquid crystal dots and a plurality of second liquid crystal dots;
assembling a second panel with the first panel,
wherein the first and the second panels have a striped array of pixel areas, each stripe extending in a first direction, and a first distance in the first direction between the first liquid crystal dots is equal to or smaller than a second distance in a second direction perpendicular to the first direction between the first liquid crystal dots, and
wherein the second liquid crystal dots are disposed near a corner of the first sealant.

19. A method of manufacturing a liquid crystal display, the method comprising:
forming a sealant on a first panel;
dropping liquid crystal on the first panel to form a plurality of first liquid crystal dots and a plurality of second liquid crystal dots;
assembling a second panel with the first panel,
wherein the first and the second panels have a striped array of pixel areas, each stripe extending in a first direction, and a first distance in the first direction between the first liquid crystal dots is equal to or smaller than a second distance in a second direction perpendicular to the first direction between the first liquid crystal dots, and
wherein the second liquid crystal dots are disposed on a periphery of the first panel.

* * * * *